Z. Sanders.
Horse Rake.
No 9007 — Patented Jun. 8, 1852.
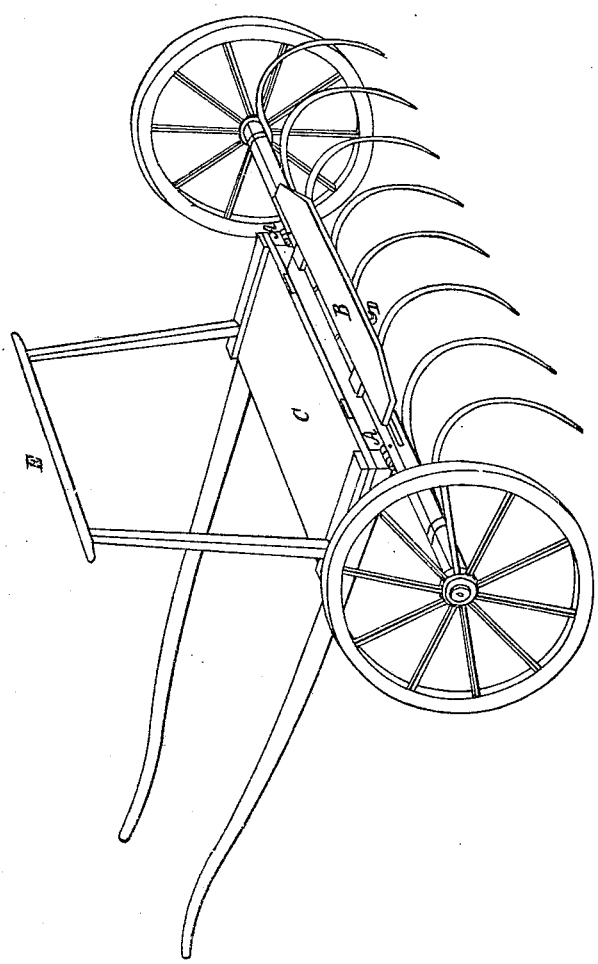

UNITED STATES PATENT OFFICE.

ZENAS SANDERS, OF WEST WINDSOR, VERMONT.

IMPROVEMENT IN HAY-RAKES.

Specification forming part of Letters Patent No. 9,007, dated June 8, 1852.

*To all whom it may concern:*

Be it known that I, ZENAS SANDERS, of West Windsor, in the county of Windsor and State of Vermont, have invented a new and useful Improvement on a Horse-Rake; and I do hereby declare that the following is a full and exact description.

The nature of my invention consists in attaching the teeth of the rake to the axle-tree or head of the rake and in attaching and adjusting the thills to the same by hinges, in order to raise the teeth from the ground and clear the same by rolling or turning the axle-tree or head, and also in attaching and adjusting the whiffletree to the same.

To enable others skilled in mechanics to make and use my invention, will proceed to describe its construction and operation. The axle-tree or head of the rake is a straight piece of timber from four to six inches square, and of such length as may be desired for the size of the rake—say from eight to twelve feet—the ends of which are rounded off, so as to receive the wheels, which may be the fore wheels of the common wagon. The rake-teeth, which are the common metallic spring-teeth, are inserted in the axle-tree or head at proper distances for spaces between the teeth and then wound round the axle-tree two or three times in grooves cut for that purpose.

The thills are attached to the axle-tree or head by means of hinges, as shown at A A in the accompanying drawing, one leaf of each hinge being attached to its respective thill and the other end inserted through the axle-tree or head, as shown in the drawing, and made fast by screws or pins, by which means the hinges may be brought near to or thrown forward from the axle-tree, as the adjustment to the weight of the operator may require.

Upon the upper side of the axle-tree or head is a form, marked B in the drawing, extending back in part over the teeth, upon which the operator stands to prevent the teeth from rising when raking. When it is desired to raise and clear the teeth, the operator steps forward on another form upon the thills, marked C in the drawing, his weight being removed from the form B to the form C, and, bearing it down, causes the head or axle-tree to turn forward, thereby raising the teeth from the ground; and when the teeth are cleared the operator steps back upon the form B, throwing the teeth down again upon the ground.

In order to increase the downward pressure of the teeth, the whiffletree is attached to a pin or strap upon the under side of the axle-tree or head at D, whereby, as the rake becomes loaded, the increased draft of the horse assists in keeping the teeth to the surface of the ground.

The whiffletree may be brought up near to or thrown down from the head, as may be found necessary to meet the resistance of the teeth when raking. The stand marked E is intended as a support for the operator.

What I claim as my invention, and desire to secure by Letters Patent, is—

The construction of the axle and rake-head with hinges connecting it with the platform, in combination with the draft-strap, to raise and depress the rake-teeth, in the manner and for the purpose set forth.

ZENAS SANDERS.

Witnesses:
N. B. SAFFORD,
SIDNEY SANDERS.